(12) United States Patent
Shehri et al.

(10) Patent No.: US 10,563,686 B2
(45) Date of Patent: Feb. 18, 2020

(54) TOOL-LESS SPRING ATTACHMENT TO C-CHANNEL AND METHOD OF USING SAME

(71) Applicant: Saudi Arabian Oil Company, Dhahran (SA)

(72) Inventors: Ali Shehri, Thuwal (SA); Brian Parrott, Thuwal (SA); Pablo Carrasco Zanini, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 373 days.

(21) Appl. No.: 15/425,441

(22) Filed: Feb. 6, 2017

(65) Prior Publication Data

US 2017/0234351 A1 Aug. 17, 2017

Related U.S. Application Data

(60) Provisional application No. 62/294,119, filed on Feb. 11, 2016.

(51) Int. Cl.
| | |
|---|---|
| *F16B 5/12* | (2006.01) |
| *F16B 21/18* | (2006.01) |
| *A46B 13/02* | (2006.01) |
| *A46B 13/00* | (2006.01) |
| *A46B 3/16* | (2006.01) |
| *F24S 40/20* | (2018.01) |

(52) U.S. Cl.
CPC ............... *F16B 21/18* (2013.01); *A46B 3/16* (2013.01); *A46B 13/005* (2013.01); *A46B 13/02* (2013.01); *F16B 5/121* (2013.01); *F16B 5/128* (2013.01); *A46B 2200/3046* (2013.01); *F24S 40/20* (2018.05)

(58) Field of Classification Search
USPC .......... 15/230.16, 230.17, 230.19; 40/661.03
See application file for complete search history.

(56) References Cited

U.S. PATENT DOCUMENTS

| | | | | |
|---|---|---|---|---|
| 2,101,804 | A * | 12/1937 | Bidwell | B42B 5/123 140/92.93 |
| 2,311,326 | A * | 2/1943 | Birkin | B60N 2/7041 140/92.4 |
| 2,767,951 | A * | 10/1956 | Cousino | A47B 57/54 248/245 |
| 2,879,569 | A * | 3/1959 | Poupitch | F16B 5/125 24/291 |

(Continued)

FOREIGN PATENT DOCUMENTS

DE 10233055 A1 2/2004

*Primary Examiner* — Matthew R McMahon
(74) *Attorney, Agent, or Firm* — Leason Ellis LLP

(57) ABSTRACT

A method and device for attaching and detaching material to a c-channel groove without requiring tools and without needing to access an end of the c-channel. The device comprises a coil-shaped element that is resiliently compressible and connected to a desired material. Through biasing or twisting the coil-shaped element, it is insertable at any point along a c-channel groove. The coil-shaped element is secured within the c-channel groove against separation therefrom through friction. A portion of the coil-shaped element can be extended outside of the c-channel groove for easy removal.

14 Claims, 4 Drawing Sheets

(56) References Cited

U.S. PATENT DOCUMENTS

| | | | | | |
|---|---|---|---|---|---|
| 3,036,354 | A | * | 5/1962 | De Bie | B01D 33/067 24/462 |
| 3,058,269 | A | * | 10/1962 | Block | B24D 13/04 451/469 |
| 3,167,824 | A | * | 2/1965 | Berwanger | B60J 10/30 49/482.1 |
| 3,235,919 | A | * | 2/1966 | Tomashot | B60J 10/30 267/167 |
| 3,412,417 | A | | 11/1968 | Ahern et al. | |
| 3,680,620 | A | * | 8/1972 | Gotschel | E06B 1/18 403/231 |
| 3,711,917 | A | * | 1/1973 | Baumgras | B21F 3/00 148/537 |
| 4,338,698 | A | * | 7/1982 | Beer | A46B 9/06 15/183 |
| 4,477,048 | A | * | 10/1984 | Conway | G09F 3/204 248/444.1 |
| 4,711,469 | A | * | 12/1987 | Bogar | B42B 5/08 281/15.1 |
| 4,758,124 | A | * | 7/1988 | Ingeberg | F16B 37/046 411/112 |
| 5,082,390 | A | | 1/1992 | Balsells | |
| 5,161,806 | A | * | 11/1992 | Balsells | F16J 15/027 267/1.5 |
| 5,310,167 | A | * | 5/1994 | Noll, Jr. | F16F 1/024 267/166 |
| 5,445,467 | A | | 8/1995 | Peleman | B42B 5/10 281/27.1 |
| 5,697,646 | A | * | 12/1997 | Venegas | B42B 5/10 281/37 |
| 5,711,430 | A | * | 1/1998 | Andersen | A47G 1/21 211/45 |
| 5,785,479 | A | * | 7/1998 | Battisti | B42B 5/123 412/38 |
| 5,819,357 | A | * | 10/1998 | Gould | A46B 13/005 15/182 |
| 5,918,885 | A | * | 7/1999 | Radke, II | F24C 15/021 24/458 |
| 6,158,597 | A | * | 12/2000 | McDermott | B42D 5/04 211/45 |
| 6,453,518 | B1 | * | 9/2002 | Adams | B42F 15/066 24/67.9 |
| 6,532,615 | B2 | * | 3/2003 | Clark | B60S 3/06 15/230.12 |
| 6,640,837 | B2 | * | 11/2003 | Mori | B42B 5/12 140/92.3 |
| 6,739,626 | B2 | * | 5/2004 | Mori | B42B 5/123 140/92.3 |
| 7,152,269 | B1 | | 12/2006 | Windel | |
| 7,438,115 | B2 | * | 10/2008 | Bohlen | E06B 9/24 160/238 |
| 7,568,853 | B2 | * | 8/2009 | Laufer | B42F 13/0006 281/29 |
| 7,914,351 | B2 | * | 3/2011 | Balsells | H01R 11/286 439/840 |
| 8,146,924 | B2 | * | 4/2012 | Ohmi | F16J 15/0887 277/647 |
| 8,251,725 | B2 | * | 8/2012 | Kasparian | H01R 13/187 439/252 |
| 8,500,918 | B1 | | 8/2013 | Meller et al. | |
| 8,727,689 | B2 | * | 5/2014 | Yoshie | B42B 5/123 412/1 |
| 9,204,948 | B2 | | 12/2015 | Kloster | |
| 9,862,221 | B2 | * | 1/2018 | Busam | B42D 1/00 |
| 10,117,366 | B2 | * | 10/2018 | Dilmaghanian | H05K 9/0016 |

\* cited by examiner

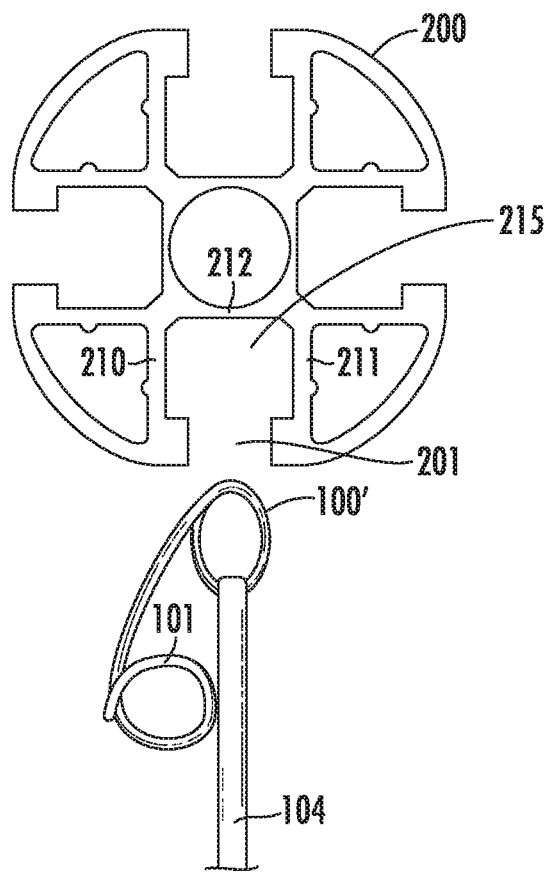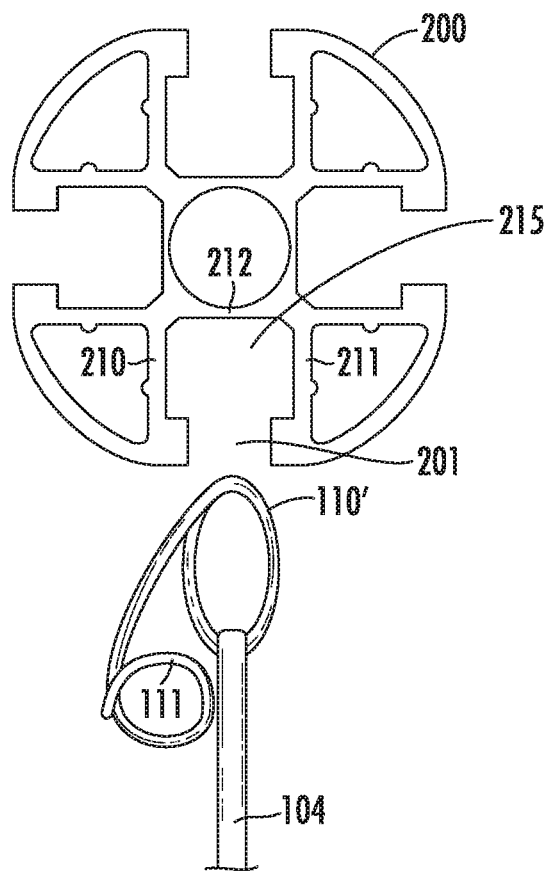
FIG. 3A    FIG. 3B
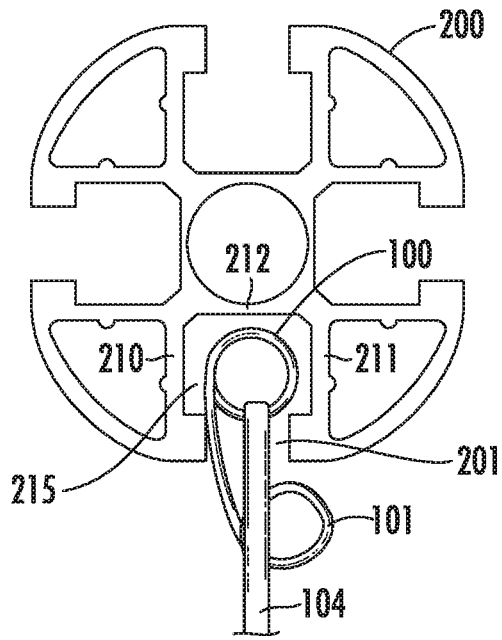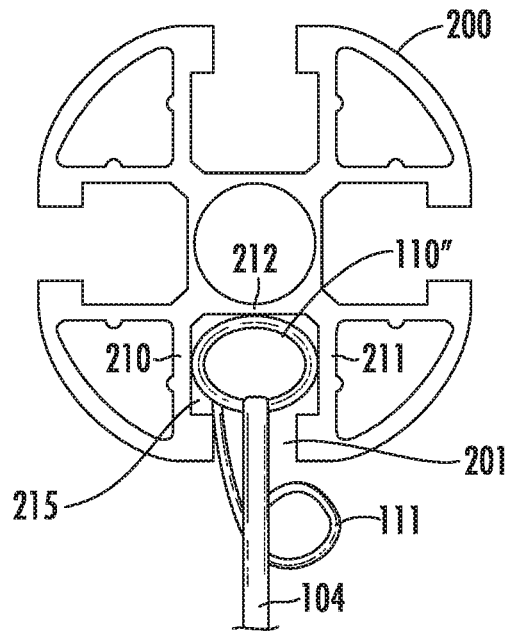
FIG. 4A    FIG. 4B

TOOL-LESS SPRING ATTACHMENT TO C-CHANNEL AND METHOD OF USING SAME

CROSS REFERENCE TO RELATED APPLICATIONS

This patent application claims the benefit of priority under 35 U.S.C. Section 119(e) from U.S. Provisional Application Ser. No. 62/294,119, filed on Feb. 11, 2016 and titled "Attachment Mechanisms For Extrusions And C-Channel Grooves," which is hereby incorporated by reference as if set forth in its entirety herein.

FIELD OF THE INVENTION

The present invention generally relates to attachment systems and methods, and more particularly, spring-like systems and methods to attach and detach materials onto a c-channel groove without any tools.

BACKGROUND OF THE INVENTION

Solar panels are a green alternative to generating electric power. Large scale power generation can include arrays of solar panels located in outdoor environments for conversion of solar energy into electrical energy. However, solar panels located in outdoor environments are exposed to sand, dust, dirt and other debris that can collect on the surfaces of the solar panels and reduce the ability of the panels to absorb light and convert it into electricity. This problem is magnified when panels are located in arid environments, such as deserts which receive high levels of solar radiation and few overcast days because these environments tend to have high levels of dust and wind leading to high deposition rates on the surface of the panels.

Robots or other cleaning vehicles can be used to assist in the cleaning of solar panels. For example, Saudi Aramco has developed a Robotic Dust Mitigation robot. Certain robots or cleaning vehicles utilize brushes with c-channels that hold the brush flaps in place. A cleaning brush, for instance, can include any combination of cleaning components, such as filaments, bristles, flaps of cloth-like material and the like, each of which is attached to the extrusion at the channel grooves. Over time and after extended use, the brush flaps must be replaced. Because of the shape of a c-channel, prior methods of replacing brush flaps required access to the ends of the brush core aluminum extension or c-channel so that the brush flaps can be slid into place. Tools were necessary to disassemble the brush so that the brush flaps could be replaced, adding to the operating and maintenance cost of the robot or cleaning vehicle. This is the method used by NOMADD Desert Solar Solutions and described in U.S. Pat. No. 8,500,918. Typically, the ends of the c-channel grooves have caps or hubs that need to be removed. If the brush that is to be replaced is in the middle of a series, all of the series elements need to be removed before the replacement piece can be added. Even after the brushes are inserted into the c-channel, they can slide along the channel unless sufficiently secured.

Materials are connected to c-channels in a variety of other industries, including the automotive industry. Car washes, for example, utilize c-channel brushes (e.g., FAVAGROSSA or SONNY'S THE CAR WASH FACTORY®). The brushes use a form of extruded material (often aluminum) with c-channels and an element that fits into the channel and supports either brush filaments or a cloth-like material. Similar to the robots and cleaning vehicles discussed above, access to the ends of the c-channel groove is necessary to replace the connected material for these brushes. Therefore, a tool-less solution to replacing materials in a c-channel is desirable.

Post-assembly nuts or T-nuts sold by aluminum extrusion manufacturers (such as by MINSUMI, MINITEC®, and REXROTH BOSCH) can be used to mount materials onto aluminum extrusions without requiring access to the ends of the c-channel groove. Even though the end of the c-channel does not need to be accessed, tools (e.g., screwdriver, screws) are still required. These nuts are also not designed to hold cloth-like materials, such as those used in certain types of brushes.

The present invention addresses the limitations associated with attaching and detaching material to a c-channel by allowing for the material to be attached or detached at any point along the c-channel. Because the material does not need to be slid into the c-channel through the end of the channel, the need for tools is eliminated and replacement time is minimized. The placement flexibility also allows for elements in the middle of a series to be easily replaced. For large scale markets, this potentially allows for significant cost savings.

The present invention addresses these and other limitations associated with attaching and detaching materials onto c-channel grooves.

SUMMARY OF THE INVENTION

According to a broad aspect of the invention, an innovative design for a coil-shaped element and method which allows for the attachment and detachment of materials onto a c-channel groove without requiring any tools and without requiring access to the ends of the groove (i.e. the attachment and detachment can be done from anywhere along the groove) is provided. The coil-shaped element can be used both in-line with the groove as well as orthogonally. A twist, squeeze, or pull motion can be used to insert or remove the coil-shaped element from the c-channel groove.

In accordance with the broad aspect of the invention, a flexible attachment for attaching and detaching material to a c-channel groove of the type having an aperture of a first dimension is provided. The attachment comprises a coil-shaped element with a second dimension that is greater than the first dimension, and a material connected to the coil-shaped element. The coil-shaped element is in a biased state such that it is navigable through the aperture of the c-channel groove at a point along the c-channel groove and positionable such that at least a portion of the biased coil-shaped element is in the c-channel groove in response to applying a force to the coil-shaped element. The coil-shaped element restores within the channel toward the second dimension so as to secure itself within the c-channel groove.

In further aspects, the coil shaped element comprises a material that is resiliently compressible in response to the applied force.

In accordance with a further aspect of the invention, the material connected to the coil-shaped element comprises sheets of cloth-like material supportable when the flexible attachment is attached to the c-channel groove to define a cleaning brush. In one arrangement, the coil-shaped element and the material are connected in a threaded connection. In one arrangement, the coil-shaped element includes a coating. In one arrangement, the material is disposable, at least in part. Further arrangements combine disposable sheets of cloth-like material, threaded connections, and coatings in a single implementation, while other implementations can combine fewer than all of these features.

In accordance with a further aspect of the invention, reinforcement is provided to prevent ripping of the coil-shaped element. In one embodiment, the inner wall of the silicone foam material that is punctured by the coil-shaped element is melted to reinforce it against ripping. As such, reinforced accessory can be provided which combines the coil-shaped element with a flexible element into a unified structure suitable for mounting and dismounting at an arbitrary location along a c-channel groove.

In accordance with a further aspect of the invention, part of the coil-shaped element is extended outside of the groove to serve as a grasp for imparting or otherwise applying a pulling force during removal. In a further embodiment, the coil-shaped element, any material attached to it, or both, are disposable upon removal.

In accordance with still further aspects of the invention, one embodiment comprises a method of installing a flexible attachment within a c-channel groove of the type having an aperture of a first dimension. The method comprises providing a resilient, coil-shaped element having a second dimension that is greater than the first dimension, wherein the coil-shaped element is in the second dimension when in a native, unbiased state; connecting a material to the coil-shaped element; applying a force to the coil-shaped element such that it is in a biased state that is less than or equal to the first dimension of the aperture; navigating the biased coil-shaped element through the aperture of the c-channel groove at a point along the c-channel groove; positioning the biased coil-shaped element such that at least a portion of the biased coil-shaped element is in the c-channel groove; and restoring the biased coil-shaped element to its second dimension.

In accordance with still further aspects of the invention, another embodiment comprises a method of installing a flexible attachment within a c-channel groove of the type having an aperture of a first dimension, with this method comprising providing a resilient, coil-shaped element having a second dimension that is greater than the third dimension, wherein the coil-shaped element is in the second dimension when in a native, unbiased state; connecting a material to the coil-shaped element; applying a force to the coil-shaped element such that it is in a biased state that is less than or equal to the first dimension of the aperture; navigating the biased coil-shaped element through the aperture of the c-channel groove at a point along the c-channel groove; positioning the biased coil-shaped element such that at least a portion of the biased coil-shaped element is in the c-channel groove; and restoring the biased coil-shaped element toward the second dimension until it is frictionally seated against the interior groove of the c-channel.

Further aspects of the foregoing methods can be included in one or more embodiments. Thus, the method can include the further step of coating the coil-shaped element prior to the connecting step. Alternatively or in addition, the method can include the further step of reinforcing the material before or after the connecting step to prevent ripping from the coil-shaped element. Alternatively or in addition, the method can include the further step of sealing at least a portion of the coil-shaped element and material, such as at an interface where the coil-shaped element and material meet. Alternatively or in addition, the method can include the further step of extending a portion of the coil-shaped element outside of the aperture. Alternatively or in addition, the method can include the further step of removing the flexible attachment from the c-channel groove by pulling on the portion of the coil-shaped element that is extended outside of the aperture. Alternatively or in addition, the step of connecting can connect the coil-shaped element to the material by threading through the material. In still further embodiments, alternatively or in addition, the method can operate such that the force applied resiliently compresses the coil-shaped element.

These and other aspects, features, and steps can be more completely appreciated with reference to the accompanying drawing figures and detailed description of certain embodiments of the invention.

BRIEF DESCRIPTION OF THE DRAWINGS

FIG. 3A is a side view of the biased coil-shaped element of FIG. 2A prior to insertion into the groove of a c-channel.

FIG. 3B is a side view of the biased coil-shaped element of FIG. 2B prior to insertion into the groove of a c-channel.

FIG. 4A is a side view of the coil-shaped element of FIG. 2A after insertion into the groove of a c-channel.

FIG. 4B is a side view of the coil-shaped element of FIG. 2B after insertion into the groove of a c-channel.

DETAILED DESCRIPTION CERTAIN OF EMBODIMENTS OF THE INVENTION

According to one or more embodiments, a coil-shaped element allows for the attachment and detachment of material onto a c-channel groove without requiring any tools and without requiring access to the ends of the groove. Attachment and detachment can be done at any point along the groove.

In one embodiment, the coil-shaped element 100 is connected to the material 104 that is to be attached or detached to the c-channel. The coil-shaped element can be made from a variety of materials that are sufficiently durable and resiliently compressible in response to an applied force. In certain embodiments, the coil-shaped element is a steel spring or a plastic spring. In other embodiments, the coil-shaped element has a coating or is made from a softer/flexible material to avoid having a sharp edge at each coil element along the pitch of the coil.

Figure 1:
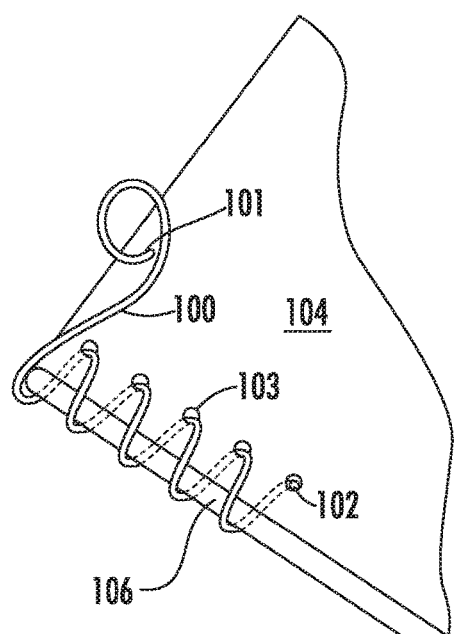
FIG. 1 is a perspective view of the coil-shaped element threaded through a material in accordance with at least one embodiment of the present invention.

In a particular embodiment, as shown in FIG. 1, at least one relatively thin sheet of material 104 is connected to the coil-shaped element 100. In certain embodiments, material 104 consists of filaments, bristles, or flaps of foam or cloth-like material. Certain materials, such as flaps of foam or cloth-like material, may be used without any connection adapters or adhesives because the coil-shaped element 100 can be directly threaded through the material 104. One type of connector or adapter may be an additional layer or extension of material that is sewn or otherwise attached to the material 104 that is to be connected. The coil-shaped element is then connected to the additional layer or extension. In one embodiment, the coil-shaped element is connected only to the additional layer or extension. Such a configuration may be useful for strings of or individual bristles or filaments that cannot be connected directly to the coil-shaped element easily. In another embodiment, the coil-shaped element is connected to both the additional layer or extension and the material 104 itself. In one embodiment, holes 103 are punctured in the material 104 so that the coil-shaped element 100 can be threaded through the material 104. In another embodiment, the coil-shaped element 100 has a piercing tip with a compressive strength selected to be sufficient to puncture a thin material without permanently deforming its coiled shape, including the segment of the coil-shaped element that is just proximal to the piercing tip. The coil-shaped element 100 can be threaded through the material by feeding end 102 through the holes 103 in the material 104. In another embodiment, an adhesive is used to attach the material 104 to the coil-shaped element 100 so that the stress is distributed over a larger area, rather than just at the contact points of the coil-shaped element 100 and the material 104. As discussed in more detail below, a sealant 106 can further be used to distribute stress over a larger area and reinforce the connection of the coil-shaped element 100 and material 104. Other methods of connecting the coil-shaped element to the material can be used.

In other embodiments, the coil-shaped element is used to mount sensors or to route cables along or within the grooves of equipment built using aluminum extrusions, such as c-channels.

Figure 2A:
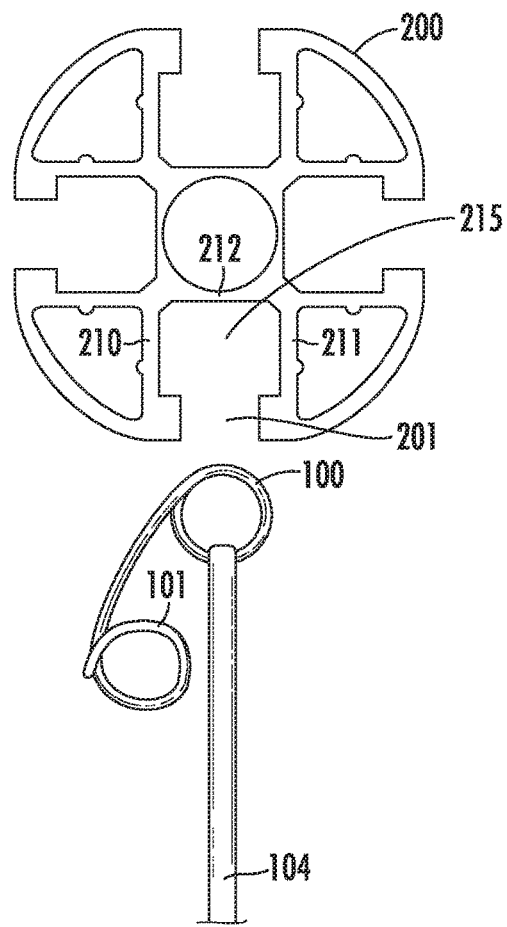
FIG. 2A is a side view of the coil-shaped element according to one arrangement prior to insertion into the groove of a c-channel.
Figure 2B:
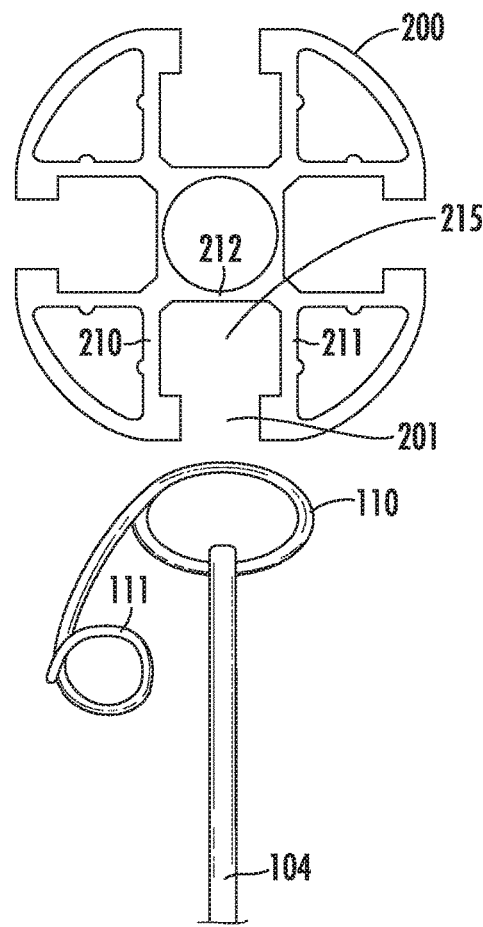
FIG. 2B is a side view of the coil-shaped element according to a further arrangement prior to insertion into the groove of a c-channel.

In another aspect of the invention, the coil-shaped element 100, 110 has a native, unbiased shape, as shown in FIGS. 2A and 2B. The interior of the c-channel groove 215 is formed by walls 210, 211, and 212. It further has an interior dimension from wall 210 to 211, and an aperture with a dimension that is less than the interior dimension from wall 210 to 211. In some embodiments, as shown in FIG. 2A, the coil-shaped element 100 has a dimension that is the same size as or wider than the aperture 201 of the c-channel 200, but less than the width of the interior of the c-channel groove (from wall 210 to 211). This enables the coil-shaped element 100 to be navigated through the aperture 201 and rest within the c-channel groove 215 without falling out of the aperture. Such a configuration may be used when the coil-shaped element 100 is the same as or close to the length of the c-channel 200, such that the coil-shaped element 100 will not slide out of place. If the coil-shaped element only covers parts of the c-channel groove, it is important to secure the coil-shaped element so that it does not slide along the groove. Some uses of the coil-shaped element 100 and material 104 may create a secure connection between the coil-shaped element 100 and the groove 215. A spinning rotation of the c-channel, for example, may create a centrifugal force that holds the coil-shaped element 100 and material 104 in place. In other embodiments, as shown in FIG. 2B, the coil-shaped element 110 has a dimension that is wider than both the aperture 201 and the interior of the c-channel groove (from wall 210 to 211). This enables the coil-shaped element to be frictionally seated against the inner walls 210, 211, 212 of the groove 215, which inhibits or impedes release of the coil-shaped element from the channel and sliding therein. Inserting the coil-shaped element orthogonally can also impede or prevent sliding.

A salient aspect of the invention is that the invention enables attachment-to and detachment-from the c-channel groove without requiring tools and without needing to access the end of the c-channel. Therefore, the material 104, whatever it may be, or the sensors or cables and so on, need not be slid into the groove from the end of the c-channel. Having the ability to attach or detach the material from anywhere along the length of the groove is particularly advantageous in systems where only a portion of the c-channel may be accessible. Inserting the material along the length of the groove instead of at the end also eliminates the need for tools to be used to disassemble and reassemble the system. The coil-shaped element can span the entire length of the c-channel groove or a portion of it such that the material 104 is only supported at certain places.

In use, a coil-shaped element is connected to the desired material 104, which can be achieved by threading or adhesive, among other means. As discussed above, the dimension of the coil-shaped element in its unbiased state is greater than the dimension of the aperture 201 of the c-channel groove. In some embodiments, a coating is applied to the coil-shaped element prior to connection to avoid it having a sharp or rough edge. In other embodiments, as discussed in more detail below, reinforcement can be added to the material 104 before or after it is connected to the coil-shaped element to prevent ripping. The coil-shaped element is then attached or mounted to the c-channel groove by twisting (and thereby advancing into the channel) or squeezing the coil-shaped element into a biased state. The application of another force can be used to get the coil-shaped element into a biased state, such as a manually applied force. The biased state results from resilient compression of the coil-shaped element along its length, not by compressing it end to end, as shown in FIGS. 3A and 3B. Enough force must be applied to bias the coil-shaped element to a dimension that is less than or equal to the dimension of the aperture 201. FIG. 3A shows biased coil-shaped element 100', which is biased to the point where it can be navigated through the aperture 201 of the groove 215. The biased coil-shaped element 100' is then positioned such that at least a portion of it is in the c-channel groove 215, as shown in FIG. 4A. The biased coil-shaped element 100' can then be restored to its original dimension, which is less than the dimension of the interior of the c-channel groove 215 but greater than the dimension of the aperture 201.

In another embodiment, as shown in FIG. 3B, the biased coil-shaped element 110' must be biased to the point where it can be navigated through the aperture 201 of the groove 215. That is, it must be biased to a dimension that is less than or equal to the dimension of the aperture 201. The biased coil-shaped element 110' is positioned such that at least a portion of it is in the c-channel groove 215. FIG. 4B shows restored coil-shaped element 110", resulting from the biased coil-shaped element 110' of FIG. 3B being restored so that the restored coil-shaped element 110" approaches the original dimension of the coil-shaped element 110. The restored coil-shaped element 110" is not fully restored to the original dimension of the coil-shaped element 110 because the original dimension of the coil-shaped element 110 is larger than both the aperture 201 and the interior of the c-channel groove 215. The biased coil-shaped element 110' of FIG. 3B will expand until it is frictionally seated against at least one of the interior walls 210, 211, 212 of the c-channel groove 215, as shown by the restored coil-shaped element 110" of FIG. 4B. Accordingly, depending on the size of the c-channel groove 215 and the coil-shaped element 100, 110, the coil-shaped element 100, 110 may expand to its original dimension or some dimension less.

In other embodiments, at least the coil-shaped element and top portion of the material 104 that is connected to the coil-shaped element are sealed together. For instance, the sealant 106 can extend along an edge or flap of the material 104, as shown in FIG. 1. In another embodiment, if an additional layer is attached to the material 104, the sealant can extend along an edge or flap of that layer (not shown as such in FIG. 1). Types of sealants may include silicone, acrylic resins, adhesive, epoxy, wax, polyurethane, or rubber. Methods of sealing may include dipping, painting or spraying, and each method can result in sealing at least a portion of the coil-shaped element and material together, whether continuously along an edge or flap of the material 104, or otherwise. The sealant 106 serves as an extra reinforcing layer and aids in distributing any stresses along a length of the material 104 or additional layer, as the case may be, rather than just at the points of contact between the coil-shaped element and the material. This can further prevent or reduce ripping of the material at the points of contact with the coil-shaped element.

Figure 5A:
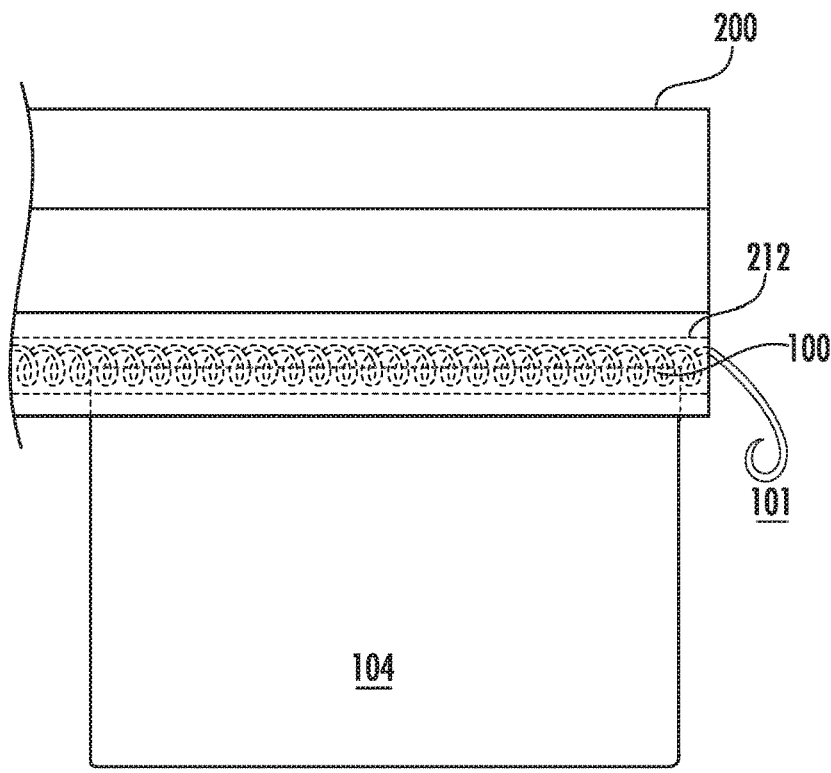
FIG. 5A is a front view of the coil-shaped element of FIG. 2A after insertion into the groove of a c-channel.
Figure 5B:
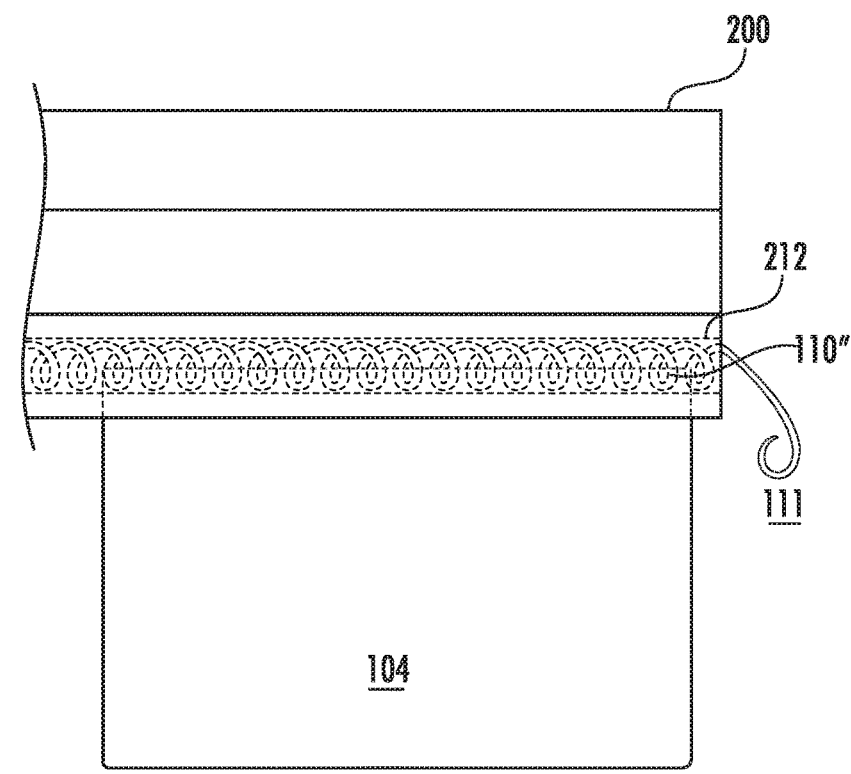
FIG. 5B is a front view of the coil-shaped element of FIG. 2B after insertion into the groove of a c-channel.

In some embodiments, when the material 104 is attached to the c-channel 200 using the coil-shaped element as shown in FIG. 5A or 5B, a cleaning brush is defined. The coil-shaped element can be attached to the c-channel groove 215 either in-line or orthogonally.

The coil-shaped element can be removed in a similar fashion to its insertion, where the coil-shaped element is biased so that it can be navigated out of the aperture 201 of the c-channel groove.

Figure 6:
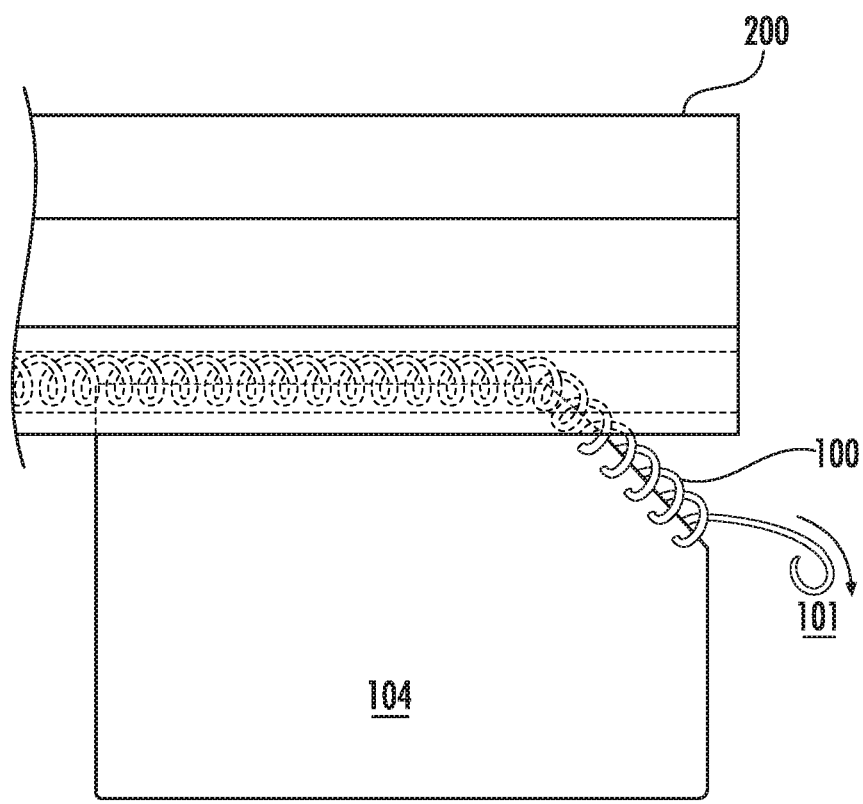
FIG. 6 is a front view of the coil-shaped element being removed from the groove of a c-channel in accordance with at least one embodiment of the present invention.

FIGS. 4A, 4B, 5A and 5B show another aspect of the invention, wherein an end portion of the coil-shaped element 101, 111 is extended outside of the aperture 201. The end portion 101, 111 protrudes out of the c-channel groove so that it is easily accessible and functions similar to a tab pull or as a pulling point. In use, this can be achieved by positioning end portion 101, 111 at an angle prior to insertion or bending end portion 101, 111 after insertion so that it extends out of the c-channel groove. FIG. 6 demonstrates that the end portion 101 can be pulled out of the c-channel groove, thereby removing the coil-shaped element 100 and the material 104 attached to it.

In other embodiments, the material 104 can be reinforced against ripping at the points where the coil-shaped element runs through the material 104 or other weak points. When polymer materials are used, such as closed-cell silicone foam sheets, the inner walls of the holes 103 can be melted to prevent ripping. An alternative reinforcement can comprise a glue seam (not shown) along the union of the material 104 and the coiled-shaped element 100.

Melting of the material after connection to the coil-shaped element can have other advantages. When the material is threaded with the coil-shaped element, micro-tears can occur. Melting of the material can aid in mending those tears and preventing further tearing or ripping of the material by the coil-shaped element.

Another aspect of the invention is to use means to secure the material to the coil-shaped element to prevent sliding or rotation around the coil-shaped element. One way to accomplish this is by melting the material onto the coil-shaped element. Another way to accomplish this is by gluing the material to the coil-shaped element at points of contact between the material and the coil-shaped element. Depending on the materials used, glue can be applied at some of the points of contact to achieve a secured connection. For example, a spot of glue can be applied at one or both ends of the coil-shaped element where it meets the material, or only where the spring enters the material. These and all securing methods described herein can be applied before, during or after the connection of the coil-shaped element to the material, whether by threading or otherwise.

In another aspect of the invention, the coil-shaped element is used to facilitate the replacement of worn out flaps on a brush with new ones. In such circumstances, the coil-shaped element and/or material can be disposable so that it does not matter if they are damaged during removal. When the element is removed, the material can also be removed.

While the invention has been described in connection with a certain embodiment thereof, the invention is not limited to the described embodiments but rather is more broadly defined by the recitations in the claims below and equivalents thereof.

What is claimed is:

1. A method of installing a flexible attachment within a c-channel groove of the type having an aperture of a first dimension along the length of the groove between ends of the groove, comprising:
   providing a resilient, coil-shaped element having a second dimension that is greater than the first dimension, wherein the coil-shaped element is in the second dimension when in a native, unbiased state;
   connecting a material to the coil-shaped element that is to be attached or detached to the c-channel groove, wherein the material includes an edge or flap,
   sealing at least a portion of the coil-shaped element and material together with a sealant along the edge or flap of the material, whereby the coil-shaped element and the material are insertable and removable through the aperture of the c-channel groove together;
   applying a force to the coil-shaped element such that it is in a biased and compressed state having a dimension that is less than or equal to the first dimension of the aperture;
   navigating the biased coil-shaped element into the aperture of the c-channel groove at a point along the c-channel groove between the ends of the groove;
   positioning the biased coil-shaped element such that at least a portion of the biased coil-shaped element is within the c-channel groove; and
   restoring the biased coil-shaped element to its second dimension.

2. The method of installing of claim 1, further comprising coating the coil-shaped element prior to the connecting step.

3. The method of installing of claim 1, further comprising reinforcing the material before or after the connecting step to prevent ripping from the coil-shaped element.

4. The method of installing of claim 1, wherein the force applied resiliently compresses the coil-shaped element.

5. The method of installing of claim 1, wherein the connecting step connects the coil-shaped element to the material by threading through the material.

6. The method of installing of claim 1, further comprising extending a portion of the coil-shaped element outside of the aperture.

7. The method of installing of claim 6, further comprising removing the flexible attachment from the c-channel groove by pulling on the portion of the coil-shaped element that is extended outside of the aperture.

8. A method of installing a flexible attachment within a c-channel groove of the type having an aperture of a first dimension along the length of the groove between ends of the groove and an interior of a third dimension that is greater than the first dimension, comprising:

providing a resilient, coil-shaped element having a second dimension that is greater than the third dimension, wherein the coil-shaped element is in the second dimension when in a native, unbiased state;

connecting a material to the coil-shaped element that is to be attached or detached to the c-channel groove, wherein the material includes an edge or flap, sealing at least a portion of the coil-shaped element and material together with a sealant along the edge or flap of the material, whereby the coil-shaped element and the material are insertable and removable through the aperture of the c-channel groove together;

applying a force to the coil-shaped element such that it is in a biased and compressed state having a dimension that is less than or equal to the first dimension of the aperture;

navigating the biased coil-shaped element into the aperture of the c-channel groove at a point along the c-channel groove between the ends of the groove;

positioning the biased coil-shaped element such that at least a portion of the biased coil-shaped element is within the c-channel groove; and restoring the biased coil-shaped element toward the second dimension until it is frictionally seated against the interior of the c-channel groove.

9. The method of installing of claim 8, further comprising coating the coil-shaped element prior to the connecting step.

10. The method of installing of claim 8, further comprising reinforcing the material before or after the connecting step to prevent ripping from the coil-shaped element.

11. The method of installing of claim 8, wherein the force applied resiliently compresses the coil-shaped element.

12. The method of installing of claim 8, wherein the connecting step connects the coil-shaped element to the material by threading through the material.

13. The method of installing of claim 8, further comprising extending a portion of the coil-shaped element outside of the aperture.

14. The method of installing of claim 13, further comprising removing the flexible attachment from the c-channel groove by pulling on the portion of the coil-shaped element that is extended outside of the aperture.

* * * * *